(12) United States Patent
Wray

(10) Patent No.: US 9,590,879 B2
(45) Date of Patent: Mar. 7, 2017

(54) CLOUD APPLICATION SCALING FRAMEWORK

(71) Applicant: Tier3, Inc., Bellevue, WA (US)

(72) Inventor: Jared Eugene Wray, Bothell, WA (US)

(73) Assignee: Tier 3, Inc., Bellevue, WA (US)

( * ) Notice: Subject to any disclaimer, the term of this patent is extended or adjusted under 35 U.S.C. 154(b) by 184 days.

(21) Appl. No.: 13/799,750

(22) Filed: Mar. 13, 2013

(65) Prior Publication Data

US 2013/0254384 A1    Sep. 26, 2013

Related U.S. Application Data

(60) Provisional application No. 61/613,881, filed on Mar. 21, 2012.

(51) Int. Cl.
*H04L 12/26* (2006.01)
*H04L 12/24* (2006.01)
*G06F 15/173* (2006.01)

(52) U.S. Cl.
CPC .......... *H04L 43/08* (2013.01); *H04L 41/0896* (2013.01); *H04L 41/145* (2013.01); *H04L 43/0817* (2013.01); *H04L 43/0876* (2013.01); *G06F 2201/865* (2013.01)

(58) Field of Classification Search
CPC ...... G06F 9/5072; G06F 9/5061; G06F 9/505; H04L 43/08; H04L 41/145; H04L 43/0817; H04L 41/0896
USPC ...................... 709/224, 223, 226; 718/1, 105
See application file for complete search history.

(56) References Cited

U.S. PATENT DOCUMENTS

| 7,624,176 | B2 * | 11/2009 | Dickerson et al. ........... 709/224 |
| 7,711,751 | B2 * | 5/2010 | Kelley ................. H04L 41/046 707/791 |
| 7,856,530 | B1 * | 12/2010 | Mu .............................. 711/119 |
| 8,108,868 | B2 * | 1/2012 | Toub ..................... G06F 9/5038 718/100 |
| 8,386,731 | B2 | 2/2013 | Mashtizadeh |

(Continued)

OTHER PUBLICATIONS

International Search Report and Written Opinion for International Application No. PCT/US2013/031026 mailed Jun. 3, 2013.

(Continued)

*Primary Examiner* — Edward Kim
*Assistant Examiner* — Zi Ye
(74) *Attorney, Agent, or Firm* — John W. Branch; Lowe Graham Jones PLLC

(57) ABSTRACT

The various embodiments may enable enterprise cloud based computing infrastructure to automatically scale cloud based applications in response to changing service demands. In at least one of the various embodiments, the monitoring application may collect operational and performance statistics about a cloud application from both internal and external monitors. In at least one of the various embodiments, a cloud application owner (user) may provide information to the system identifying one or more critical paths for one or more cloud applications. In at least one of the various embodiments, based on the monitoring data and the critical path information the cloud application scaling framework may determine the resource scaling and/or caching that may be appropriate for a monitored application.

21 Claims, 8 Drawing Sheets

(56) References Cited

U.S. PATENT DOCUMENTS

| | | | |
|---|---|---|---|
| 8,756,609 B2* | 6/2014 | Dasgupta et al. | 718/105 |
| 8,886,788 B2 | 11/2014 | Tung et al. | |
| 2007/0074208 A1 | 3/2007 | Ling et al. | |
| 2007/0234327 A1* | 10/2007 | Baxter | H04L 29/06027 717/151 |
| 2008/0059972 A1* | 3/2008 | Ding | G06F 9/505 718/105 |
| 2009/0037680 A1 | 2/2009 | Colbert et al. | |
| 2009/0116389 A1 | 5/2009 | Ji et al. | |
| 2010/0082321 A1 | 4/2010 | Cherkasova et al. | |
| 2010/0083248 A1 | 4/2010 | Wood et al. | |
| 2010/0191845 A1 | 7/2010 | Ginzton | |
| 2010/0199276 A1 | 8/2010 | Umbehocker | |
| 2010/0250748 A1* | 9/2010 | Sivasubramanian et al. | 709/226 |
| 2010/0306767 A1 | 12/2010 | Dehaan | |
| 2010/0325197 A1 | 12/2010 | Heim | |
| 2011/0055377 A1 | 3/2011 | Dehaan | |
| 2011/0072208 A1 | 3/2011 | Gulati et al. | |
| 2011/0078303 A1 | 3/2011 | Li et al. | |
| 2011/0142064 A1 | 6/2011 | Dubal et al. | |
| 2011/0145153 A1 | 6/2011 | Dawson et al. | |
| 2011/0213875 A1 | 9/2011 | Ferris et al. | |
| 2011/0225017 A1 | 9/2011 | Radhakrishnan | |
| 2011/0249871 A1* | 10/2011 | Zamora Cura | H04L 67/02 382/113 |
| 2011/0258621 A1* | 10/2011 | Kern | 718/1 |
| 2011/0295999 A1 | 12/2011 | Ferris et al. | |
| 2011/0307573 A1 | 12/2011 | Lingafelt et al. | |
| 2012/0054280 A1 | 3/2012 | Shah | |
| 2012/0066371 A1 | 3/2012 | Patel et al. | |
| 2012/0131594 A1 | 5/2012 | Morgan | |
| 2012/0173709 A1 | 7/2012 | Li et al. | |
| 2013/0054776 A1* | 2/2013 | Kunze et al. | 709/224 |
| 2013/0086273 A1 | 4/2013 | Wray et al. | |

OTHER PUBLICATIONS

International Search Report and Written Opinion for International Application No. PCT/US2013/031046 mailed May 30, 2013.

International Search Report for International Application No. PCT/US2012/058776 mailed Mar. 26, 2013.

Office Communication for U.S. Appl No. 13/645,073 mailed on Aug. 20, 2014.

Office Communication for U.S. Appl No. 13/645,073 mailed on Jan. 9, 2015.

Office Communication for U.S. Appl No. 13/799,184 mailed on Jan. 22, 2015.

* cited by examiner

CLOUD APPLICATION SCALING FRAMEWORK

CROSS REFERENCE TO RELATED APPLICATIONS

This application claims the benefit of U.S. Provisional Application, titled "Cloud Application Scaling Framework," Ser. No. 61/613,881 filed on Mar. 21, 2012, the benefit of which is hereby claimed under 35 U.S.C. §119(e), and which is further incorporated herein by reference.

TECHNICAL FIELD

Embodiments relate generally to managing computing resources made available to applications and processes executing in enterprise cloud based environments. In particular, embodiments may be related to scaling of computing resources for cloud applications.

BACKGROUND

Applications and processes executing in enterprise cloud based environments may be hindered because of the lack of flexible proactive resource scaling. Applications and processes executing in the cloud may have to adapt to varying resource requirements based on customer and business needs. Reactively scaling computing resources at the time usage demand increases may be insufficient since the demand is occurring before additional resources have been provisioned. And the provisioning for accommodating the increased usage demands may require a service interruption to complete the provisioning. Accordingly, operators may be faced with the unsatisfactory choice between the expensive over-provisioning of computers resources, or reactively scaling computer resources when demand increases occur. Further, some cloud based applications (cloud applications) may have unique performance characteristics where performance problems may cause significant negative impact on overall application performance. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE EMBODIMENTS

Figure 1:
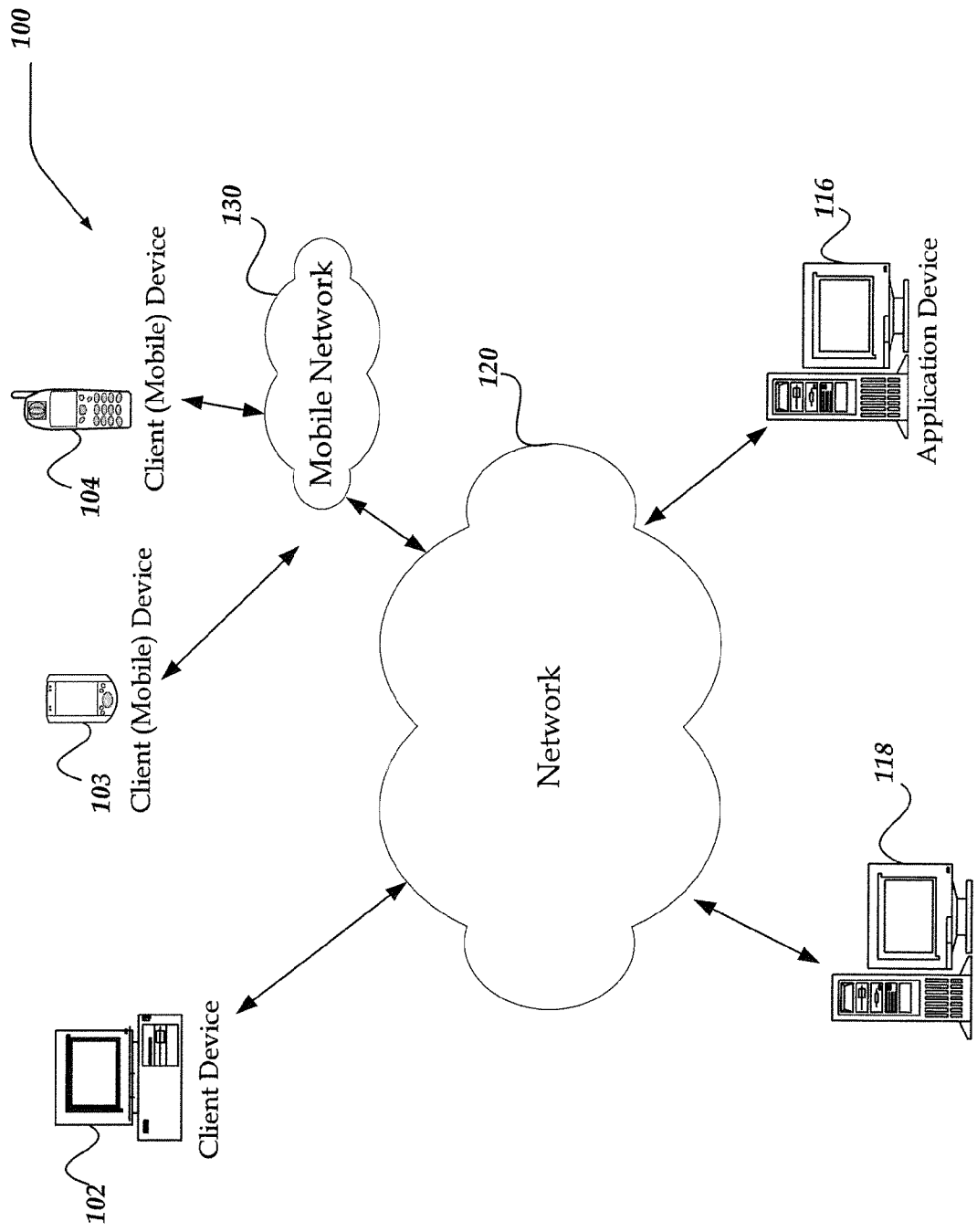
FIG. 1 illustrates an overview of a system in which various embodiments may be practiced.

Various embodiments now will be described more fully hereinafter with reference to the accompanying drawings, which form a part hereof, and which show, by way of illustration, specific various embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "cloud application" refers to computer programs, processes, and/or applications that may be operating in a cloud based environment. Often such applications may be accessed by end users using clients such as web browsers, mobile applications, light desktop clients, or the like. Though not required some cloud applications may be arranged such that most of the business objects, business logic, and data may be stored on servers in the cloud separate from the end user client devices. Further, cloud application may be location transparent enabling end users to access the applications almost anywhere where network connectivity may be found.

As used herein, the term "web application" refers to a cloud application that may be mostly dedicated to serving web pages to end users. Web applications may serve various web content, including, but not limited to, static html pages, dynamic html pages, web objects, scripts, streaming content (e.g., video or music), or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, at least one of the various embodiments may enable the automatic scaling cloud based applications in response to changing service demands. In at least one of the various embodiments, a monitoring application may collect operational and performance statistics about a cloud application from both internal and external monitors. In at least one of the various embodiments, a cloud application operator (user) may provide information to the system identifying one or more critical paths for one or more cloud applications. In at least one of the various embodiments, based on the monitoring data and the critical path information the cloud application scaling framework may determine the resource scaling and/or caching that may be appropriate for a monitored application.

In at least one of the various embodiments, the system may monitor at least one external performance metric for the critical paths that may be included in the monitored applications. Further, in at least one of the various embodiments, internal performance metrics may be monitored for at least one computing resource.

In at least one of the various embodiments, monitoring external performance metrics may include grouping the external performance metric into at least one batch, classified based on a time period, such as hourly, daily, weekly, or the like.

In at least one of the various embodiments, the cloud scaling system may generate at least one application scaling score for monitored applications based on the external performance metrics. Further, performance metrics may be normalized and compared using one or more formulas for to determine if the scaling exceeds a defined threshold. If the application scaling score exceeds the defined scaling threshold, additional application instances may be provisioned. In at least one of the various embodiments, provisioning additional application instances may include provisioning virtual machines for hosting the additional application instances.

In at least one of the various embodiments, a computing resource scaling score based on internal performance metrics and a defined resource scaling threshold may be generated. In at least one of the various embodiments, monitoring the internal performance metrics may include, monitoring at least one of a disk usage metric, a CPU usage metric, or a memory usage metric. In at least one of the various embodiments, monitoring internal performance metrics may be further enabled by arranging a hypervisor to monitor one or more of the virtualized computer resources associated with virtual machines that may be managed by the hypervisor. If the resource scaling score exceeds the defined resource scaling threshold, at computing resource may be scaled appropriately based on the resource scaling score.

In at least one of the various embodiments, the cloud scaling system may cache requested application resources based on external performance metrics, such as load times, or the like. In at least one of the various embodiments, determining application critical paths may be based on monitoring of a plurality of application requests that include a portion of the path to the critical resource.

Illustrative Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client device(s) 102, mobile (client) devices 103-104, network 120, mobile network 130, one or more cloud application scaling framework device 118. Network 120 is in communication with and enables communication between each of the elements of system 100. Mobile network 130 further enables telephonic communication with wireless communication devices such as mobile device 104. Also, system 100 includes one or more application devices 116.

Client devices 102-104 may include virtually any computing device capable of receiving and sending a message over a network, and/or to and from another computing device. The set of such client devices may include devices that typically connect to a network using a wired communications medium such as personal computers, tablet computers, multiprocessor systems, microprocessor-based or programmable consumer electronics, network PCs, and the like. Further, client devices 102-104 may include any mobile device that is also, or instead, capable of connecting to a network via a wireless communication signal such as a personal digital assistant (PDA), pocket PC, wearable computer, portable computing device, tablet computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of these devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like. Client devices 102-104 may further include a voice over IP (VOIP) application that enables voice communication over network 120 separate from mobile network 130.

Network 120 is configured to couple one computing device to another computing device, enabling them to communicate. Network 120 is enabled to employ any form of medium for communicating information from one electronic device to another. Also, network 120 may include a wireless interface, and/or a wired interface, such as the Internet, Cloud Computing, and the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), wide code division multiple access (WCDMA), high speed downlink packet access (HSDPA), long Willi evolution (LTE), ultra wide band (UWB), IEEE 802.16 Worldwide Interoperability for Microwave Access (WiMax), Wi-Fi IEEE 802.11, and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Mobile network 130 may include wireless interfaces, wireless forms of communication, and/or wireless links such as cellular networks, satellite links, Infra-Red, Micro-Wave links, Open Air Laser links, and the like. These wireless links may include various mobile communication protocols such as wireless application protocol (WAP), global system for mobile communications (GSM), code division multiple access (CDMA), wide code division multiple access (WCDMA), long term evolution (LTE), high speed downlink packet access (HSDPA), time division multiple access (TDMA), general packet radio service (GPRS), ultra wide band (UWB), IEEE 802.16 Worldwide Interoperability for Microwave Access (WiMax), Wi-Fi IEEE 802.11, and the like.

The communication media used to transmit information in mobile communication links as described above may generally include any communication media that is processor readable by a computing device. Such media may include any processor readable non-transitory storage media. Processor readable media may also include transitory wired and/or wireless communication media, or any combination thereof Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, and the like. By way of example, communication media includes wireless media such as fluids or space for acoustic, RF, microwave, infrared, free space laser, and other wireless signals, and wired media such as twisted pair, coaxial cable, fiber optics, wave guides, and other wired media.

Cloud application scaling framework device(s) 118 and application device(s) 116 may comprise multiple computing devices, components of a single computing device, or a single device with multiple software features. In some embodiments, cloud application scaling framework device (s) 118 and/or application device(s) may comprise a cluster of network devices, such that functionality is shared among the network devices of the cluster in a load-balanced and/or parallel processing. In some embodiments, system 100 may include load balancers (not shown) or other network devices that manage the load balancing of tasks among cloud application scaling framework device (s) 118 and/or application device(s) respectively.

In some embodiments, cloud scaling framework device(s) 118 and application device(s) 116 may use external data storage for storing data. The stored data may include web sites, databases, log files, online journals (e.g., blogs), photos, reviews, and information regarding online services such as messaging, search, news, shopping, advertising, travel services, or virtually any other type of data. Additionally, in some embodiments, a user of client devices 102-104 may access data and application(s) installed on cloud application scaling framework device(s) 118 and application device(s) 116.

In at least one of the various embodiments, application device(s) 116 may include one or more applications, including web applications, cloud applications, or the like. In at least one of the various embodiments, applications may be operating in a cloud-based and/or virtualized environment that may include one or more virtual machines.

Illustrative Network Device

Figure 2:
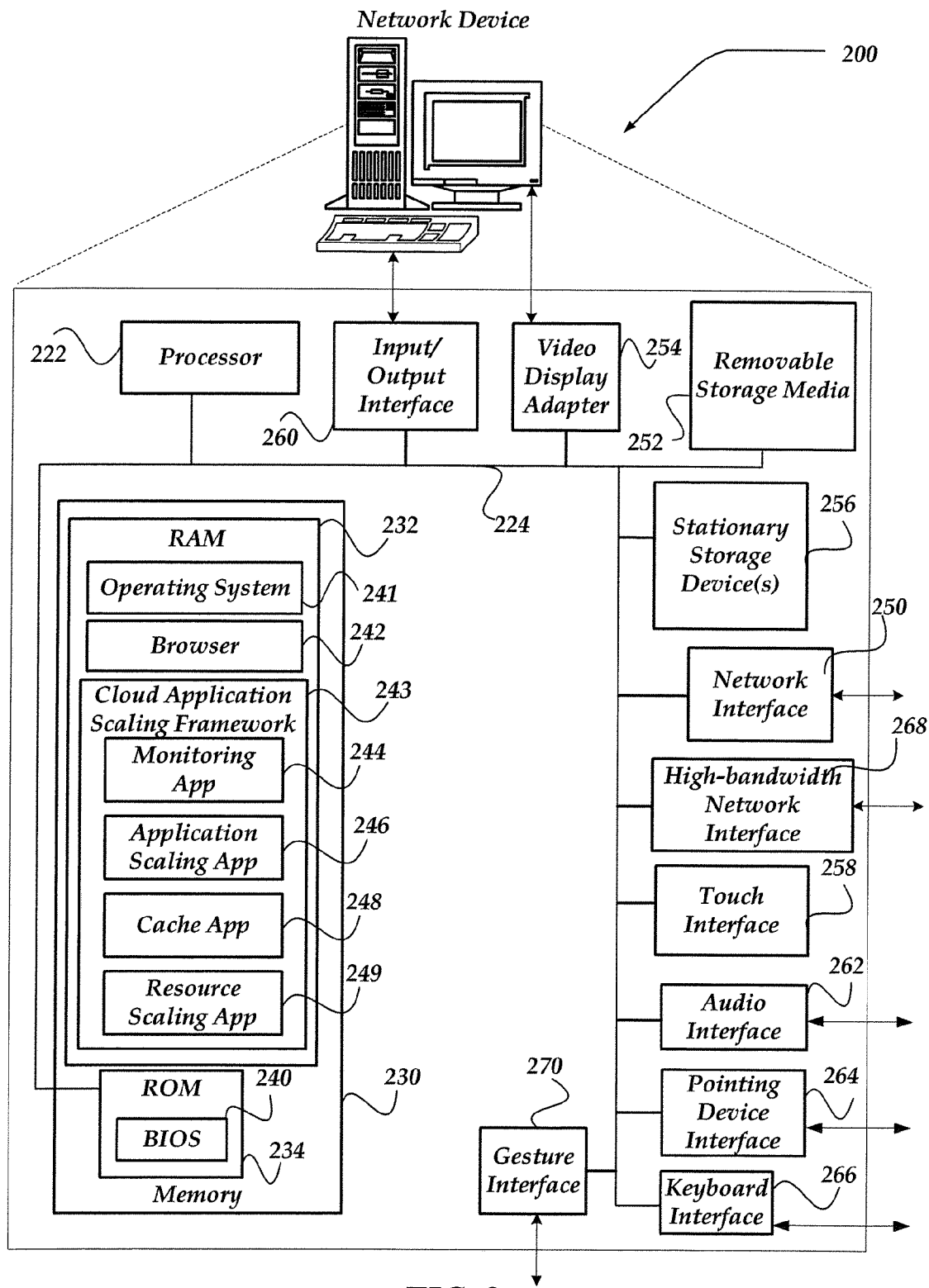
FIG. 2 shows a network device that may be arranged to perform actions in accordance with at least one of the various embodiments.

FIG. 2 shows one embodiment of a network device, according to at least one of the embodiments. Network device 200 may include many more, or fewer, components than those shown. The components shown, however, are sufficient to disclose an illustrative embodiment. Network device 200 may represent, for example, cloud application scaling framework device 118 and application device 116 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Apple Mac OS®, Microsoft Windows®, UNIX, or LINUX®, or a specialized mobile communication operating system such as Apple iOS®, Google Android®, Microsoft Windows Mobile™, the Symbian® operating system, and the like. The operating system may include, or interface with a Java® virtual machine module that enables control of hardware components and/or operating system operations via Java application programs.

Memory 230 can be utilized by network device 200 to store programs, applications, software modules, and the like, as well as the data used by such programs, applications, and/or software modules. Applications may comprise processor executable instructions which can be executed by network device 200. Programs in mass memory 230 may include a browser application 242. Browser 242 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 230 may also include cloud application scaling framework (CASF) 243 that may including one or more monitoring applications 244, application scaling application 246, cache application 248, and resource scaling application 249.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a Joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 241, and/or programs in memory 230. Interaction with the user interface includes visual interaction via a display coupled to video display adapter 254. The user interface can also include gesture interface 270, touch interface 258, pointing device interface 264, keyboard interface 266, and audio interface 262.

Network device 200 may include removable storage media 252 and stationary storage device(s) 256. Removable storage media 252 can comprise one or more of an optical disc drive, flash memory drive, hard drive, a floppy disk drive, tape drive, and/or any other type of processor readable non-transitory storage media. Stationary storage device 256 or removable storage media 252 may include any method or technology for processor readable non-volatile storage of data, such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 250, network device 200 can communicate with a communication protocol, such as Ethernet and the like, with a wide area network such as the Internet, a cloud network, a local area network, a wired telephone network, a cellular telephone network, or some other communications network, such as networks 120 and/or mobile network 130 in FIG. 1. Additionally, high bandwidth network interface 268 is provided to enable network device 200 to communicate with other co-located network devices at vastly greater speeds than network interface 250. For example, network device 200 may be physically embodied on a "blade" or card in a chassis that supports the operation of several co-located blades and provides access to a high bandwidth network backplane for the network devices to communicate particular information between each other over high bandwidth network interface 268.

Illustrative Client Device

Figure 3:
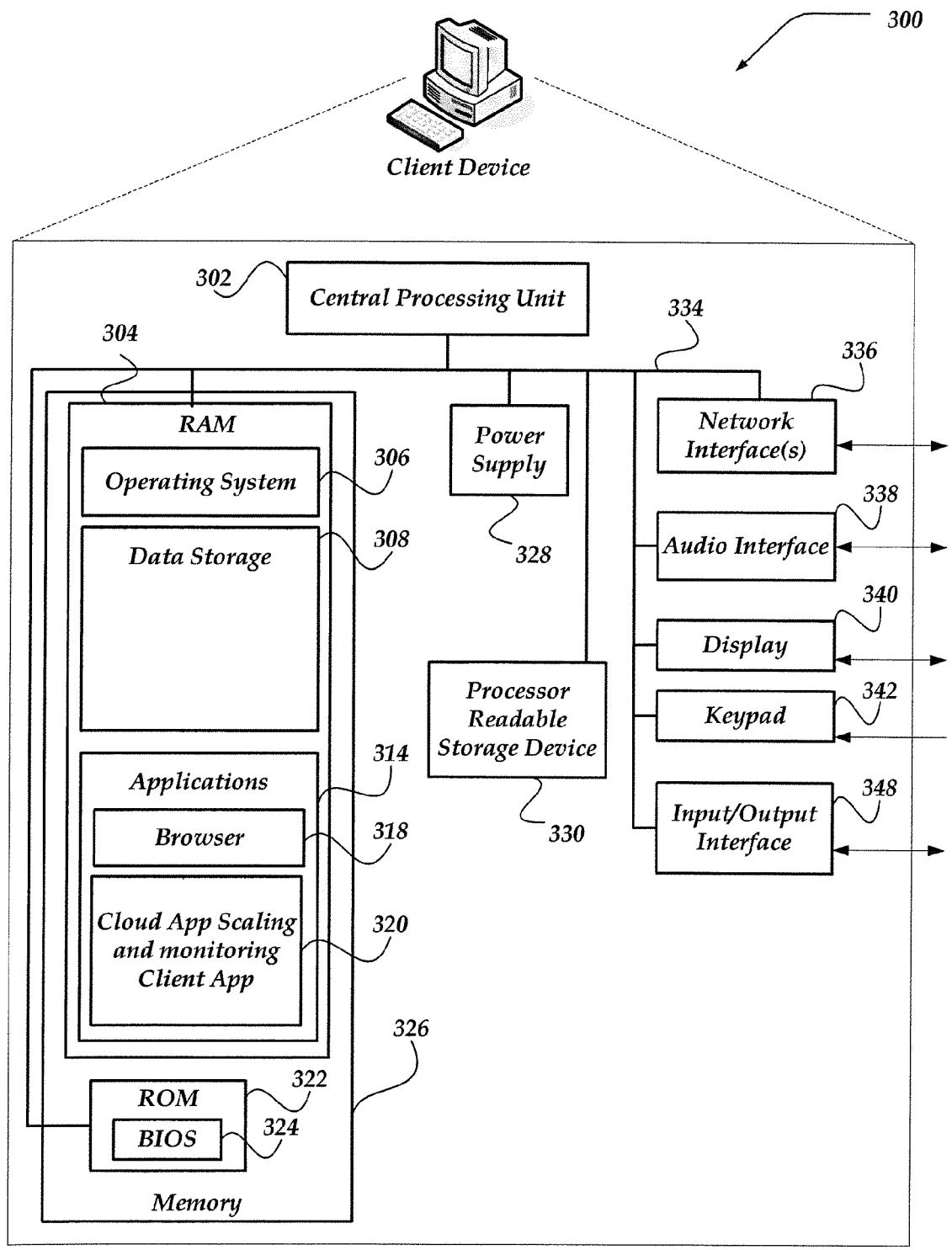
FIG. 3 shows a client device that may be arranged to perform actions in accordance with at least one of the various embodiments.

FIG. 3 shows one embodiment of client device 300 that may be included in a system implementing at least one of the various embodiments. Client device 300 may include many more or less components than those shown in FIG. 3. However, the components shown are sufficient to disclose an illustrative embodiment for practicing the present invention. Client device 300 may represent, for example, one embodiment of at least one of client devices 102-104 of FIG. 1.

As shown in the figure, client device 300 includes a central processing unit ("CPU") 302 in communication with a mass memory 326 via a bus 334. Client device 300 also includes a power supply 328, one or more network interfaces 336, an audio interface 338, a display 340, a keypad 342, and an input/output interface 348. Power supply 328 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 336 includes circuitry for coupling client device 300 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 336 is sometimes known as a transceiver, transceiving device, or network interface card ("NIC").

Audio interface 338 may be arranged to produce and receive audio signals such as the sound of a human voice. For example, audio interface 338 may be coupled to a speaker and microphone (not shown) to enable telecommunication with others and/or generate an audio acknowledgement for some action. Display 340 may be a liquid crystal display ("LCD"), gas plasma, light emitting diode ("LED"), or any other type of display used with a computing device. Display 340 may also include a touch sensitive screen arranged to receive input from an object such as a stylus or a digit from a human hand.

Keypad 342 may comprise any input device arranged to receive input from a user. For example, keypad 342 may include a push button numeric dial, or a keyboard. Keypad 342 may also include command buttons that are associated with selecting and sending images.

Client device 300 also comprises input/output interface 348 for communicating with external devices, such as a headset, or other input or output devices not shown in FIG. 3. Input/output interface 348 can utilize one or more communication technologies, such as USB, infrared, Bluetooth™, or the like.

Mass memory 326 includes a Random Access Memory ("RAM") 304, a Read-only Memory ("ROM") 322, and other storage means. Mass memory 326 illustrates an example of computer readable storage media (devices) for storage of information such as computer readable instructions, data structures, program modules or other data. Mass memory 326 stores a basic input/output system ("BIOS") 324 for controlling low-level operation of client device 300. The mass memory also stores an operating system 306 for controlling the operation of client device 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 326 further includes one or more data storage 308, which can be utilized by client device 300 to store, among other things, applications 314 and/or other data. For example, data storage 308 may also be employed to store information that describes various capabilities of client device 300. The information may then be provided to another device based on a variety of events, including being sent as part of a header during a communication, sent upon request, or the like. At least a portion of the information may also be stored on a disk drive or other computer-readable storage device (not shown) within client device 300. In one of the various embodiments, data storage 308 may store data associated with cloud application scaling applications generated in part by CASF device 118.

Applications 314 may include computer executable instructions which, when executed by client device 300, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 314 may include, for example, browser 318 and cloud application scaling and monitoring client application 320. In at least one of the various embodiments, cloud application scaling and monitoring client application 320 may be arranged to communicate with application scaling app 250, resource scaling application 249, cache application 248, or the like. In some embodiments, this communication may enable client device 300 to at least monitor and administer the actions performed by network device 300.

Browser 318 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 318 may enable a user of client device 300 to communicate with another network device, such as CASF device 118 of FIG. 1. In one embodiment, browser 318 may enable a user to view and/or manipulate applications that may be operating on CASF device 118.

Illustrative Logical Architecture

Figure 4:
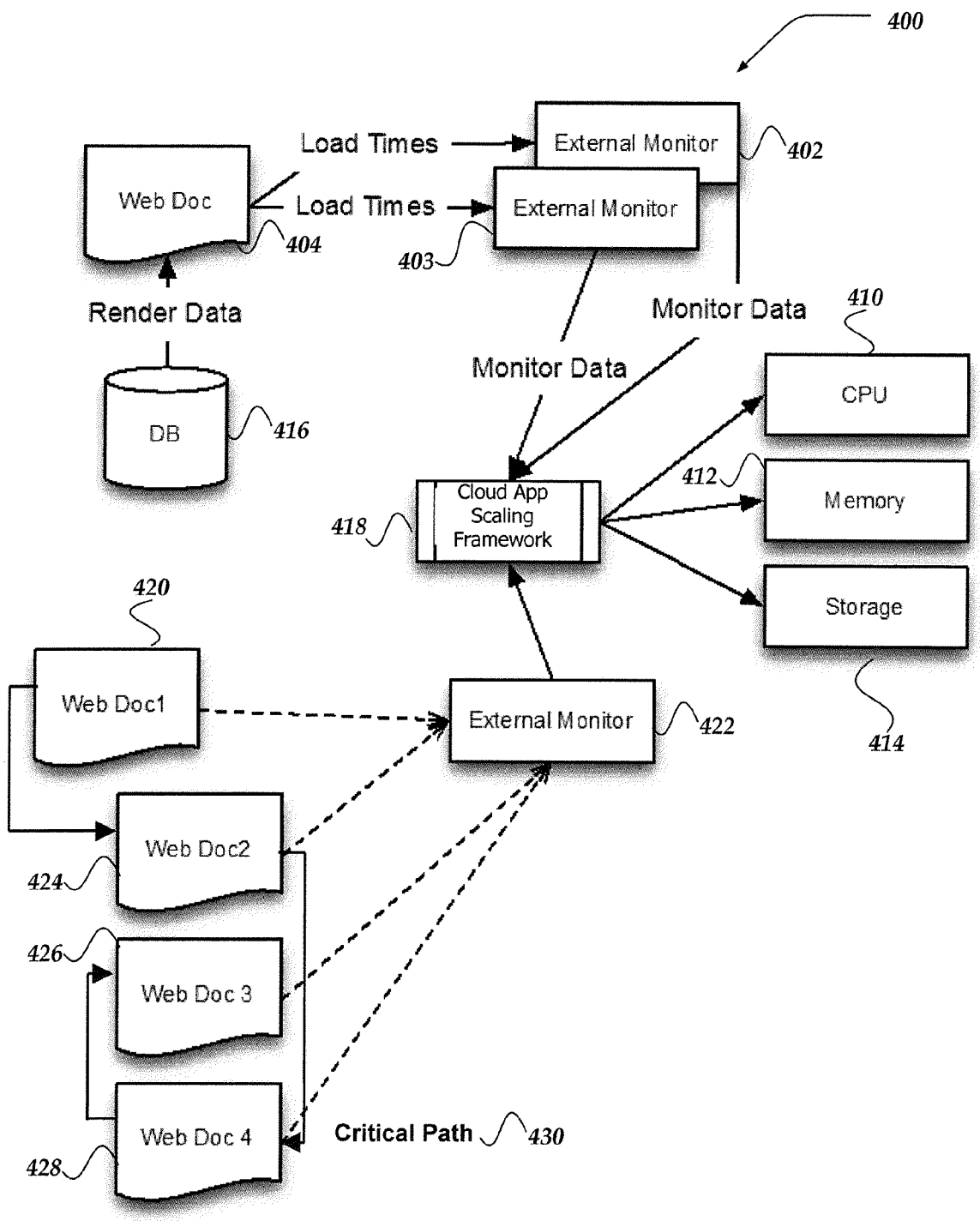
FIG. 4 shows an overview of a system adapted to perform actions in accordance with at least one of the various embodiments.

FIG. 4 shows system 400 of at least one of the various embodiments for web scaling. In at least one of the various embodiments, at least one external monitor, such as external monitors 402 and 403 may be configured to monitor metrics, such as, load times 405-406 for web documents, such as, web document 404 that may be generated by a cloud application, such as a web application.

In at least one of the various embodiments, the CASF may receive critical path definitions from users and/or administrators of the cloud application. In at least one of the various embodiments, a critical path, such as, critical path 430 may be a particular navigation path or sequence of actions performed on a cloud application. For example, in at least one of the various embodiments, a cloud application that may include web document 420, web document, 424, web document 426, and web document 428 may have critical path 430 that may be described as starting at web document 420; navigating to web document 424; from web document 424 to web document 428; and web document 428 navigating to web document 426.

In at least one of the various embodiments, there may be various reasons to define one or more critical paths. In at least one of the various embodiments, critical paths may be defined based on activities that may be performed by a user of the cloud application. In at least one of the various embodiments, they may be defined to identify portions of a cloud application where a consumer user may have an expectation of performance and/or reliability.

In at least one of the various embodiments, critical paths in a cloud application may be defined based on the importance of the actions that may occur when the web documents that may be part of the critical path may be accessed by a user. In at least one of the various embodiments, more than one critical path may be defined for a cloud application. Likewise, in at least one of the various embodiments, separate critical paths may overlap, in that paths may include some of the same web documents.

In at least one of the various embodiments, critical paths may be defined to indicate web documents of a cloud application that may have higher availability requirements. In at least one of the various embodiments, such portions of cloud applications may be accessed often by users and/or the critical path web documents may perform operations critical to the function of the cloud application.

In at least one of the various embodiments, the order in which the web documents may be accessed by a user may be a property of a critical path. In at least one of the various embodiments, other critical paths may include some of the same web documents but the path between documents may be different—users may access the shared document in one or more different sequence orders.

In at least one of the various embodiments, critical path information may be used by the CASF to anticipate the resources that may be required if a user may be determined to be on a critical path (e.g., accessing web documents declared to be part of a critical path).

Also, in at least one of the various embodiments, one or more critical paths may be determined based on an analysis of the received monitoring information. In at least one of the various embodiments, the CASF may be enabled to derive critical paths based on the history of usage and history of system resource impact of particular paths of actions generated by users interacting with cloud applications. In at least one of the various embodiments, the CASF may recommend candidate critical paths based on the analysis of the received monitoring data. If candidate critical paths may be available a user may be selected from among them to determine with candidate paths may be configured to be active.

Also, in at least one of the various embodiments, in some cases the CASF may be configured to automatically characterize some identified candidate paths as critical paths. For example, if the number of times a detected candidate critical path is accessed exceeds a defined threshold, the CASF may automatically characterize the candidate critical path as an active critical path. Thus, the CASF may use the monitoring information to automatically deter mine which paths are critical.

In at least one of the various embodiments, the CASF may monitor the sufficiency of computing resources that may be allocated to one or more cloud applications. In at least one of the various embodiments, such computing resources may include, CPU quota utilization, network bandwidth, memory, storage access I/O, storage volume, number of threads, number of processes, file handles, mutex/semaphore, counts, shared memory, or the like. In at least one of the various embodiments, storage may be disk drives, solid state drives (SSD), or the like.

In at least one of the various embodiments, if the CASF determines that a cloud application requires resource scaling, the CASF may be arranged to determine the appropriate resources for the cloud application and may direct an operating system and/or other supervisory process to adjust the resources that may be allocated to the cloud application (e.g., quotas).

In at least one of the various embodiments, a supervisory process may be a hypervisor that may be managing one or more virtual machines that may be hosting the cloud applications being monitored by the CASF.

In at least one of the various embodiments, CASF 418 may be provided data from external monitors 402 and 403. Also, external monitor 422, which may be arranged to monitor the performance of one or more critical paths, such as, critical path 430, may provide data to CASF 418.

In at least one of the various embodiments, external monitors may provide data to regarding the state of affairs from a point of view outside the local network. Although each external monitor may be enabled to uses their own proprietary data formats the data points they may offer may include, latency to site, length of time for page loads, errors on the site, or the like.

In at least one of the various embodiments, based in part on the monitoring information, user configurations, business rules, policies, or the like, CASF 418 may determine resource allocation for the various resources used by a cloud application. For example, in at least one of the various embodiments, CPU 410, memory 412, and storage 414 may be scaled based on determinations made by CASF 418. One of ordinary skill in the art will appreciate that more or fewer components than that are discussed herein may be monitored without departing from the spirit and scope of the invention. Also, that more or less computing resource may be scaled by CASF 418 without departing from the spirit and scope of the invention.

Generalized Operations

Figure 5A:
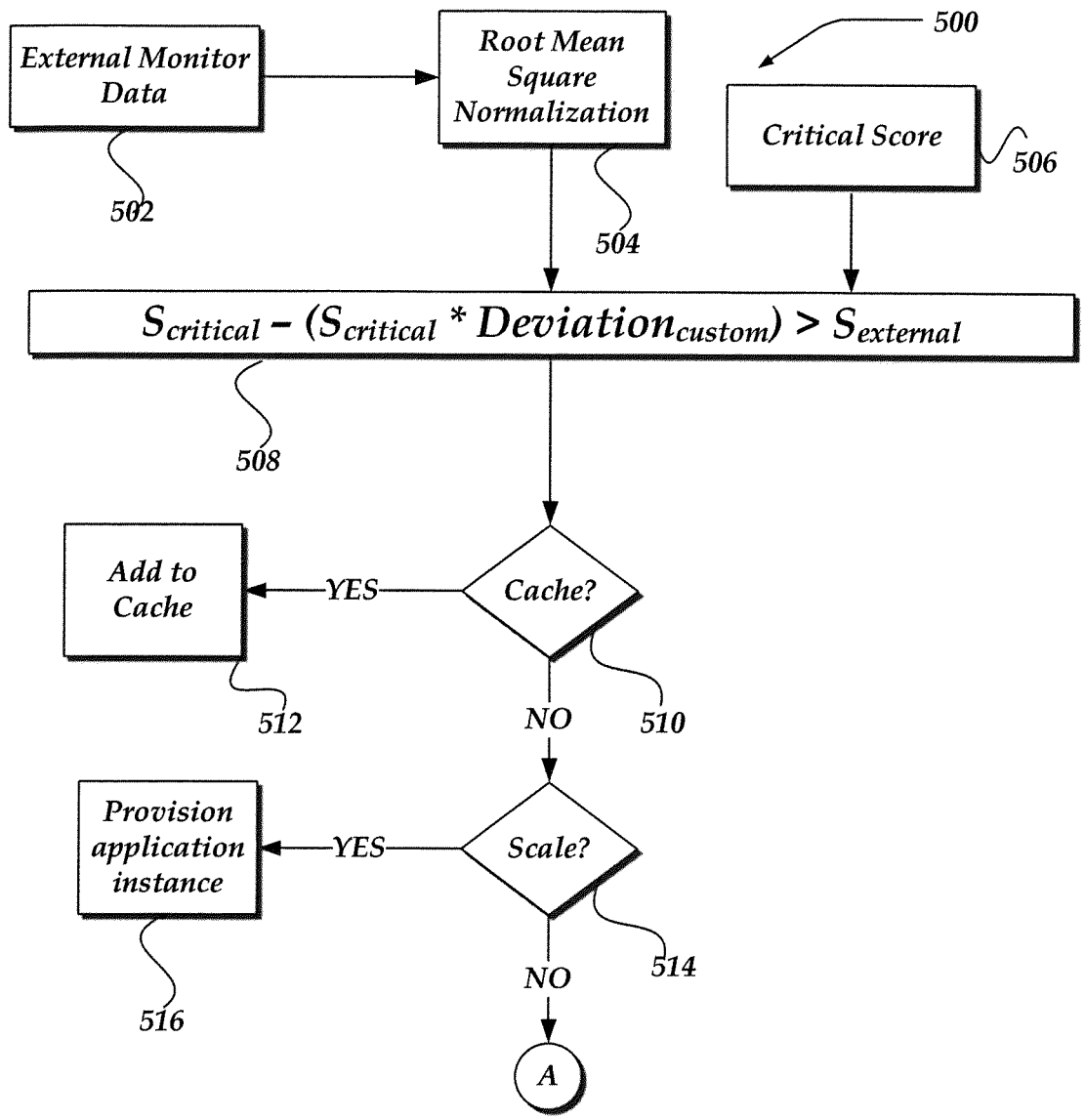
FIGS. 5A-5B shows a flow chart for a process for scaling resources for cloud applications in accordance with at least one of the various embodiments.

FIG. 5A shows a flow chart for process 500 for scaling resources for cloud applications in accordance with at least one of the various embodiments.

At block 502, in at least one of the various embodiments, external monitor data may be provided by a CASF operating on a computing device, such as, CASF device 118.

In at least one of the various embodiments, the external monitoring may be directed to collect performance statistics for one or more web documents and/or cloud application resources that may comprise various defined critical paths. For example, web document load times may be monitored for documents that may be included in the critical paths.

At block 504, the received external monitor data may be normalized. In at least one of the various embodiments, external monitor data may include web application and/or web document load times. The CASF may use a variety of well-known normalization techniques including root mean square normalization.

At block 506, in at least one of the various embodiments, one or more scores representing the performance scores for critical path documents may be provided. In at least one of the various embodiments, the critical score information may retrieved from a database, local cache, or the like.

In at least one of the various embodiments, one or more characteristics of the web documents may be used to determine (lookup) the critical path values for computing the scaling threshold. Also, in at least one of the various embodiments, meta-data that may be included with the web documents (e.g., identifiers stored in HTTP cookies) may be used to find the particular critical values that correspond to the web documents that may be under consideration.

In at least one of the various embodiments, each critical path may be configured to have different formula values. Also, in at least one of the various embodiments, the threshold and deviation values may be set to different values for documents within the same critical path. Or, in other cases, the critical path response times may be measured and monitored for the entire critical path (e.g., combined response times for multiple documents).

At block 508, determine if the normalized monitored data produced from external monitoring exceeds a scaling threshold based on one or more threshold determining formulas.

In at least one of the various embodiments, one formula may be:

$$S_{critical} - (S_{critical} * \text{Deviation}_{custom}) > S_{external}$$

In at least one of the various embodiments, Scritical may be a user configurable value that reflects the importance of a given critical path. Likewise, in at least one of the various embodiments, Deviation may be a user supplied value that indicates the amount of variance from the Scritical that the user may be willing to accept before scaling should be triggered.

At decision block 510, in at least one of the various embodiments, if the caching threshold test may be met, control may flow to block 512. Otherwise, control may flow to decision block 516 if caching is not appropriate.

Figure 5B:
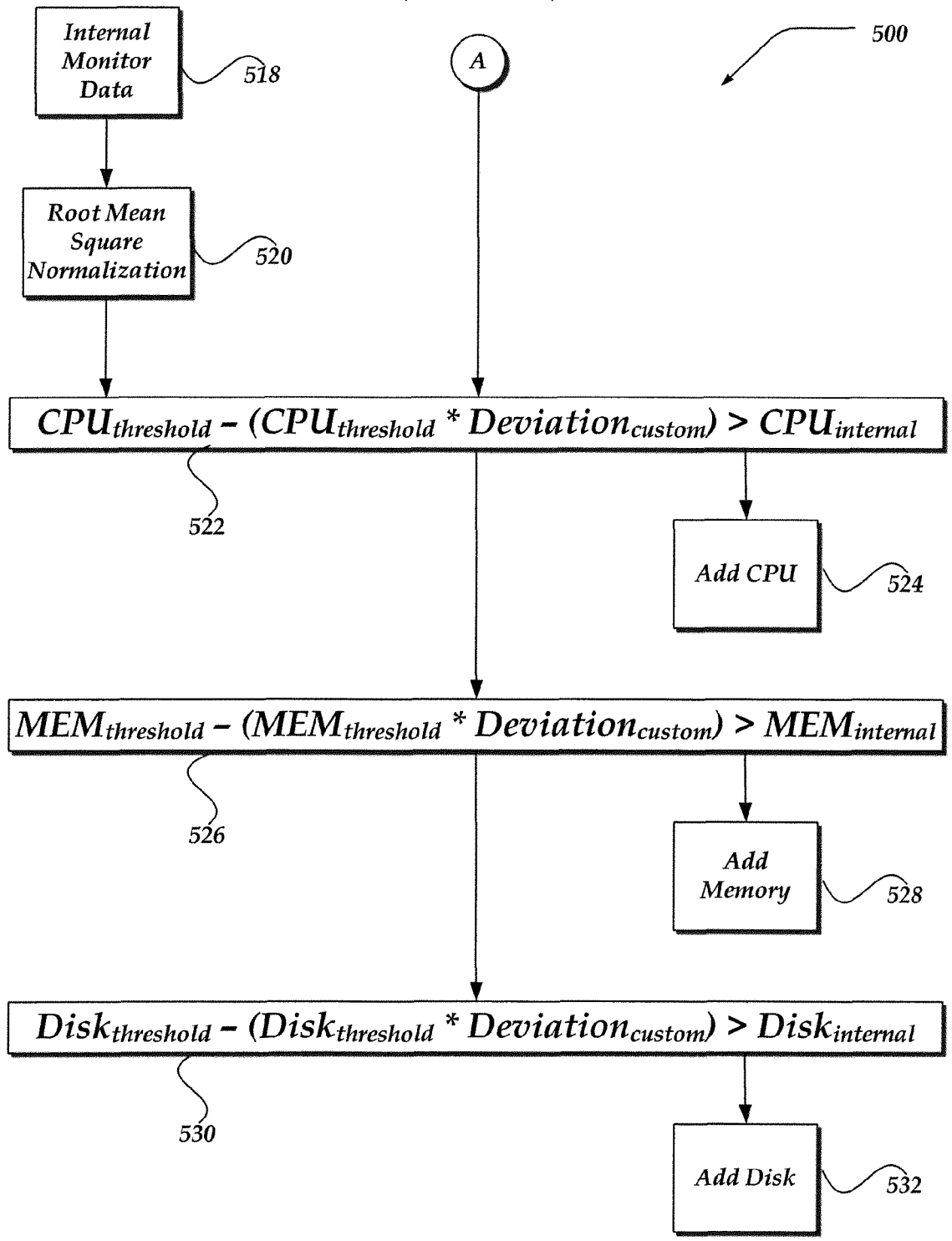

At decision block 514, in at least one of the various embodiments, if it is appropriate to scale the cloud application by provisioning another virtual machine instance for the cloud application, control may flow to block 516. Otherwise, in at least one of the various embodiments, control may flow to FIG. 5B through connector A, where the CASF may proceed to analyze one or more components of the underlying physical and/or virtual machines that may be hosting the cloud application(s) being monitored.

At block 516, the CASF may provision one or more application instances for the web application that is being monitored. The flowchart for process 500 continues to FIG. 5B and flows into block 522.

In at least one of the various embodiments, the CASF may provision one or more application programs, such as, web servers, database server, middle-ware service, or the like, depending on the type application is being scaled. Further, in at least one of the various embodiments, the type of application provisioned may vary based on the monitor data that may be used to trigger the provisioning.

For example, if a delay is database responsiveness may have triggered the scaling then database instances may be provisioned. Likewise, if the delay may be caused because there are not enough web servers to process connection requests, more web servers may be provisioned.

In at least one of the various embodiments, configuration settings, business rule driven policies, or the like, may be used to determine which critical values may be associated with which application for provisioning.

At block 518, in at least one of the various embodiments, component scaling data generated by internal monitors may be used in the computations for determining whether to increase or decrease component resource allocations for a particular cloud application. For example, the at least one of the various embodiments depicted in FIG. 5 may receive internal monitor data for CPU utilization, memory, and disk usage. In at least one of the various embodiments, other component metrics may be used.

At block 522, in at least one of the various embodiments, the CASF may compute one or more scores for determine if the CPU resources for the monitored web application should be scaled, the formula for determining a score for CPU scaling may include:

$$CPU_{threshold} - (CPU_{threshold} * Deviation_{custom}) > CPU_{internal}$$

In at least one of the various embodiments, a CPUthreshold value may be tied to a particular cloud application and configured by a user. In at least one of the various embodiments, a default value may be configured as well to accommodate cloud application that may not have a specified CPU threshold value.

In at least one of the various embodiments, similar to the application critical path monitoring discussed above, the user may also determine a deviation value that is appropriate for a particular cloud application.

At block 524, in at least one of the various embodiments, if the predicted CPU score exceeds the current CPU allocation, the CASF may allocate additional CPU resources to the web application that is being monitored. In at least one of the various embodiments, in some cloud based environments, the CASF may allocate additional CPU resources by updating the CPU usage quota tables/configuration for the virtual machines that may be hosting the monitored web application.

In at least one of the various embodiments, the allocation of CPU resources may be proportional to how far the scaling score exceeds that the current value for the CPU. In at least one of the various embodiments, the resources may be incremented stepwise using predefined amounts.

At block 526, in at least one of the various embodiments, the formula for Memory scaling may include:

$$Memory_{threshold} - (Memory_{threshold} * Deviation_{custom}) > Memory_{internal}$$

In at least one of the various embodiments, a Memory threshold value may be tied to a particular cloud application and configured by a user. In at least one of the various embodiments, a default value may be configured as well to accommodate cloud application that may not have a specified Memory threshold value.

In at least one of the various embodiments, similar to the application critical path monitoring discussed above, the user may also determine a deviation value that is appropriate for a particular cloud application.

At block 528, in at least one of the various embodiments, if the predicted memory usage exceeds the current memory allocation, the CASF may allocate additional memory resources to the web application. In at least one of the various embodiments, in some cloud based environments, the CASF may allocate additional memory resources by updating the memory quota tables/configurations for the virtual machines that may be hosting the monitored web application.

In at least one of the various embodiments, the allocation of memory resources may be proportional to how far the scaling score exceeds that current memory usage. In at least one of the various embodiments, the memory resources may be incremented stepwise using predefined amounts.

At block 530, in at least one of the various embodiments, the formula for storage usage scaling may include:

$$Disk_{threshold} - (Disk_{threshold} * Deviation_{custom}) > Disk_{internal}$$

In at least one of the various embodiments, a disk threshold value may be tied to a particular cloud application and configured by a user. In at least one of the various embodiments, a default value may be configured as well to accommodate a cloud application that may not have a specified disk threshold value.

In at least one of the various embodiments, similar to the application critical path monitoring discussed above, the user may also determine a disk storage deviation value that is appropriate for a particular cloud application. In at least one of the various embodiments, storage and/or disk drives may include solid state drives (SSD), or the like.

At block, 532, if the prediction for future storage needs exceeds the current allocation of storage resources, additional storage resources (e.g., disk drives, SSD units, or the like) may be provisioned for the web application. In at least one of the various embodiments, in some cloud based environments, the CASF may allocate additional storage resources by updating the storage quotas for the virtual machines that may be hosting the monitored web application.

In at least one of the various embodiments, the allocation of storage resources may be proportional to how far the scaling score exceeds current disk storage score. In at least one of the various embodiments, the storage resources may be incremented stepwise using predefined amounts. In at least one of the various embodiments, storage resources may be allocated from one or more storage devices that may be available over a network.

In at least one of the various embodiments, in some cases the provisioning of resources may require that the web application and/or one or more virtual machines to be restarted/rebooted. In at least one of the various embodiments, the CASF may be configured request permission from a user before restarting/rebooting a web application and/or a virtual machine. In at least one of the various embodiments, if restarting/rebooting is necessary it may be scheduled for some time in the future.

One of ordinary skill in the art will appreciate that other formulas and calculations may be used without departing from these innovations.

Figure 6A:
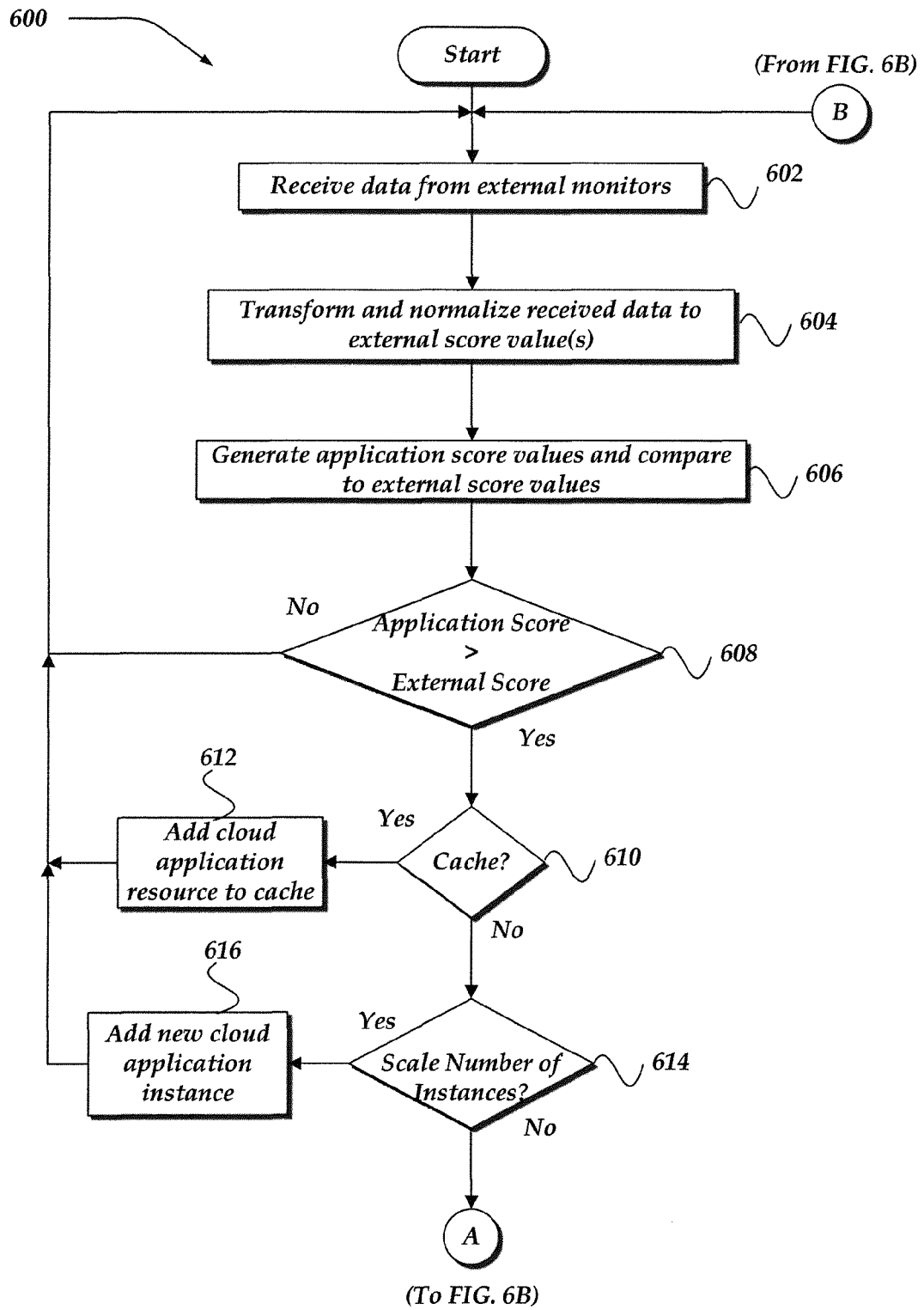
FIG. 6A-6B shows a flow chart for a process for scaling resources for cloud applications in accordance with at least one of the various embodiments.

FIG. 6A shows a flow chart generally showing one embodiment of an overview process 600 for use in receiving data from external monitors for determining cloud application scaling in accordance with the embodiments. After a start block, at block 602, in at least one of the various embodiments, data may be received from external monitors. In at least one of the various embodiments, the one or more external monitors may forward the collected performance and activity information to the CASF. In at least one of the various embodiments, external monitors may forward information to the CASF in a variety of formats, including, XML, CSV, HTML, log files, or the like.

Further, in at least one of the various embodiments, the external monitors may provide raw data, aggregated data, pre-formatted data, or the like. In at least one of the various embodiments, the external monitors may forward data grouped into batches, classified based on time periods (e.g., hourly, daily, weekly, monthly, or the like), type of data (e.g., system log records, web server log records, database log records, or the like), size of batch (e.g., forward data in 10 megabyte batches), or the like. Further, in at least one of the various embodiments, the external monitors may stream monitoring data real-time (or close to real-time) to the CASF.

In at least one of the various embodiments, the CASF may poll the external monitors and/or pull data from the external monitors. Furthermore, in at least one of the various embodiments, the CASF may be configured to employ one or more data collection strategies that may depend on the external monitors that may be in use.

At block 604, in at least one of the various embodiments, the monitoring data may be transformed and normalized resulting in one or more external scores.

In at least one of the various embodiments, the received data may be normalized to a defined range using data normalization techniques such as, root-mean square normalization.

At block 606, in at least one of the various embodiments, application scores may be generated and compared to the external scores. In at least one of the various embodiments, the application scores may be based on if the external monitor data indicates that a critical path of a cloud application may be involved in the monitored activities.

In at least one of the various embodiments, internal and external scores may be computed based on the classification of the web application and other web application that may have the same classification. In at least one of the various embodiments, these scores enable a comparison of internal to external views of monitored web application performance. In at least one of the various embodiments, at optimal performance these external and internal scores may be the same value and in real world operations acceptable performance may be indicated if the scores remains within a nominal percent range of each other. If major variations may be detected, that may indicate a situation that needs further examination and perhaps to be acted upon.

At decision block 608, in at least one of the various embodiments, if comparing the external scores with the application scores indicates that the resources allocated to the cloud application may be need to be adjusted, control may move to decision block 610. Otherwise, in at least one of the various embodiments, control may loop back to block 602.

At decision block 610, in at least one of the various embodiments, a determination may be made if caching of cloud application resources may be indicated. In at least one of the various embodiments, a caching determination may be influenced by a variety of factors including the type of actions being performed by the cloud application, type of request(s) being made by a cloud application user, the load on the system, the type of user actions that may be determined to be impacting cloud application performance, or the like. For example, if the cloud application performance may be impacted by repeated user requests for static resources, such as, images, videos, static html, or the like, caching of the resources may be indicated. In at least one of the various embodiments, if caching may be indicated control may move to block 612. Otherwise, in at least one of the various embodiments, control may move to decision block 614.

At block, 612, in at least one of the various embodiments, the requested cloud application resource may be added to a cache. In at least one of the various embodiments, one or more caches of multiple types or implementations may be used by the CASF. In at least one of the various embodiments, caches may be arranged, configured, and located in various ways based on usage and performance patterns of the cloud application. For example, caches may be implemented using databases and/or file systems provided by the CASF. Or, in some cases, caching facilities built-in to the cloud based environment may be used. In either case, the CASF employs the monitoring data and scoring to determine if a resource should be cached and where to cache it.

Also, in at least one of the various embodiments, the underlying implementation and/or location of the cache may be vary based on the type of resources, size of resources, rate of request, geographical proximity, or the like. Accordingly, in at least one of the various embodiments, caches may be implemented using hard drives, SAN's, high-speed memory, or the like. In at least one of the various embodiments, configuration values may be set by a user to define which cache facilities may be used for the different types of resources. Next, in at least one of the various embodiments, control may loop back to block 602.

At decision block 614, in at least one of the various embodiments, if cloud application instance scaling may be indicated, control may move to block 616. Otherwise, control may move to connector A (to FIG. 6B).

At block 616, in at least one of the various embodiments, one or more new instances of the cloud application may be instantiated. In at least one of the various embodiments, a new web server process may be instantiated for hosting the cloud application. In at least one of the various embodiments, in some cases, a new instance of a virtual machine may be provisioned to host another instance of the cloud application. In at least one of the various embodiments, in some cases the provisioned resources may be standing-by in a queue or some other form a resource pool.

In at least one of the various embodiments, the CASF may determine where the new allocations for the web application may be located. In at least one of the various embodiments, the resources may be provisioned on particular physical machine and/or machine clusters that may be beneficially located. Next, in at least one of the various embodiments, control may loop back to block 602.

Figure 6B:
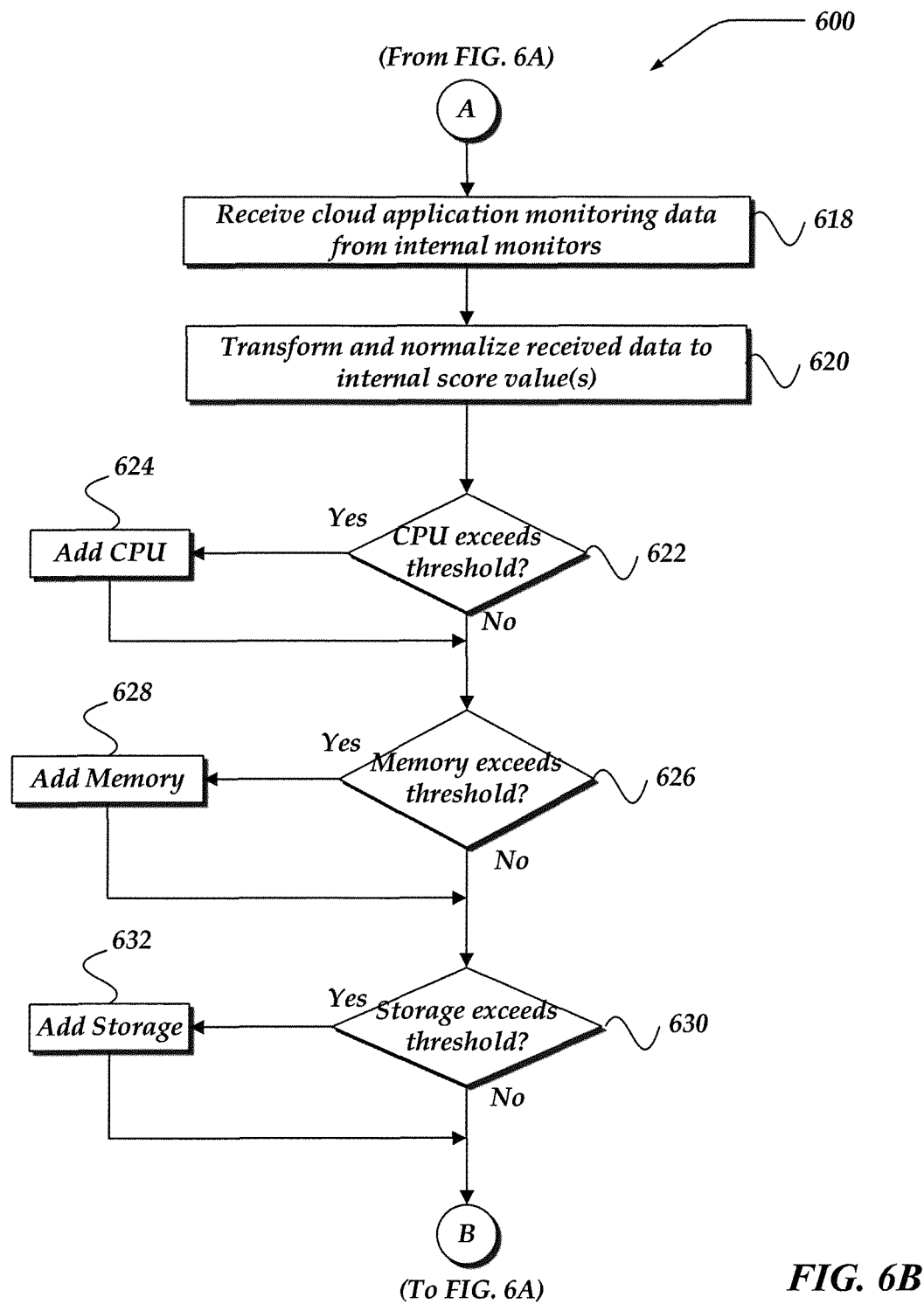

FIG. 6B illustrates a flow chart showing a continuation of process 600 for use in receiving data from monitors for determining cloud application scaling in accordance with the embodiments. After connector A (coming from FIG. 6A), at block 618, in at least one of the various embodiments, data may be received from internal monitors. In at least one of the various embodiments, the internal monitors may be monitoring and reporting metrics associated with the physical and/or virtual machine that may be hosting the cloud application.

At block 620, in at least one of the various embodiments, the data provided by the internal monitors may be transformed and normalized to produce values representing a score for one or more performance metrics that may be associated with the cloud application(s). In at least one of the various embodiments, the received data may be normalized to a defined range using one or more data normalization techniques including root-mean square normalization.

In at least one of the various embodiments, the internal monitors may submit raw data, aggregated data, pre-formatted data, or the like. Further, in at least one of the various embodiments, internal monitors may forward information to the CASF using a variety of formats, including, XML, CSV, HTML, text files, data streams, or the like.

In at least one of the various embodiments, internal monitors may forward data records that may be grouped into batches. In at least one of the various embodiments, data records may be classified based on time periods (e.g., hourly, daily, weekly, monthly, or the like), type of data (e.g., system log records, web server log records, database log records, or the like), size of batch (e.g., forward data in 10 megabyte batches), or the like. Also, in at least one of the various embodiments, the internal monitors may provide streaming data metrics based on real-time (or close to real-time) monitoring.

In at least one of the various embodiments, process 600 may poll the internal monitors and/or pull data from the internal monitors. Furthermore, in at least one of the various embodiments, process 600 may be configured to employ one or more data collection strategies that may depend on the internal monitors that may be in use.

At decision block 622, in at least one of the various embodiments, the internal and external data may be used to determine a resource scaling core for determining if CPU scaling may be indicated. In at least one of the various embodiments, CPU scaling may be based on various internal metrics such as CPU utilization, number of threads and/or processes being processed, performance characteristics of threads and/or applications (e.g., some processes may be associated with high CPU requirements), or the like. In at least one of the various embodiments, if the resource scaling score corresponding to CPU allocation for the cloud application may be determined to exceed a determined threshold, control may move to block 624. Otherwise, in at least one of the various embodiments, control may move to decision block 626.

In at least one of the various embodiments, the formula for determining if CPU usage exceeds a threshold may include determining if the CPU usage deviation multiplied by a user configurable coefficient exceeds a user defined threshold.

In at least one of the various embodiments, this enables the user to tune the sensitivity of the CASF based on the characteristics of individual cloud applications. Also, a user may tune the data normalization procedures to account for the known performance characteristics of individual cloud applications. For example, if an application is known to have very brief spikes in usage the normalization procedures may be configured to use an extended running averages windows to smooth out the effects off the sage spikes. In contrast, if another cloud application is known to have rapid and sustained increases in usage requirements the running average windows may be reduced in duration to decrease the CASF response time for responding to rapid changes in resource needs.

At block 624, in at least one of the various embodiments, additional CPU resources may be allocated to the cloud application. In at least one of the various embodiments, allocating additional CPU resources may comprise increasing the number of CPU slices available to a cloud application, increasing the size/duration of CPU slices, enabling access to additional virtual CPU's, enabling access to additional physical CPU's and/or CPU cores, enabling access to distributed CPU processing (e.g., on another physical sever), or the like.

In at least one of the various embodiments, process 600 may provide additional CPU resources to the cloud application by using operating system features to determine CPU quota for processes. In at least one of the various embodiments, in a virtual machine environment hypervisor features may be leveraged to establish and enforce CPU resource allocations. In some cases, in at least one of the various embodiments, customized processes and libraries may be provided to establish and enforce the allocation of CPU resources. Next, control may move to decision block 626.

At decision block 626, in at least one of the various embodiments, the internal and external data may be used to determine a resource scaling score for determining if Memory scaling may be indicated. In at least one of the various embodiments, metrics used for determining memory scaling may include, the number resident memory pages, number of virtual pages, rate of page swapping, number of threads and/or processes associated with the cloud application, or the like.

In at least one of the various embodiments, if the resource scaling score corresponding to Memory allocation for the cloud application may be determined to be exceed a determined threshold, control may move to block 628. Otherwise, in at least one of the various embodiments, control may move to decision block 630.

At block 628, in at least one of the various embodiments, additional memory resources may be allocated and associated to the cloud application. In at least one of the various embodiments, process 600 may provide additional Memory resources to the cloud application by using operating system features to determine Memory quota for processes. In at least one of the various embodiments, in a virtual machine environment, hypervisor features may be leveraged to establish and enforce Memory resource allocations. In some cases, in at least one of the various embodiments, customized processes and libraries may be provided to establish and enforce the allocation of Memory resources. Next, in at least one of the various embodiments, control may move to decision block 630.

At decision block 630, in at least one of the various embodiments, the internal and external data may be used to determine a resource scaling score for determining if storage usage scaling be indicated In at least one of the various embodiments, metrics that may be applied may include, storage capacity, read transfer rates, write transfer rates, input/output interface bandwidth utilization, time consumed by disk activity, I/O characteristics (e.g., random versus sequential access), response times, or the like.

In at least one of the various embodiments, if the resource scaling score corresponding to storage usage allocation for the cloud application may be determined to exceed a determined threshold, control may move to block 632. Otherwise, in at least one of the various embodiments, control may move to connector B (to FIG. 6A).

At block 632, in at least one of the various embodiments, additional storage resources may be allocated and associated to the cloud application. In at least one of the various embodiments, process 600 may provide additional storage resources to the cloud application by using operating system features to establish storage quota for processes, or the like. In at least one of the various embodiments, in a virtual machine environment, hypervisor features may be utilized to establish and enforce disk resource allocations. In some cases, in at least one of the various embodiments, customized processes and libraries may be provided to establish and enforce the allocation of storage resources. Next, in at least one of the various embodiments, control may move to connector B (to FIG. 6A).

In at least one of the various embodiments, more or less computing resource components may be monitored and applied to scaling computing resources for the cloud application, such as, network bandwidth, number of network connections made to the cloud application, amount of data transferred, number of threads, file handles, or the like. In at least one of the various embodiments, metrics made available by an operating system, a hypervisor, custom monitoring tools, or the like, may be monitored and taken into account during the cloud application scaling process.

Further, in at least one of the various embodiments, increasing the allocation of one or more resources to a cloud application may require a determined quantity of one or more resources to be de-allocated from one or more other cloud applications. In at least one of the various embodiments, cloud applications competing for and/or sharing resources may be prioritized based on performance factors determined from the received monitor data. Also, in at least one of the various embodiments, cloud application priority may be determined by user definition and/or configuration.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for scaling computing resources for a plurality of network devices over a network, wherein one or more network devices is operative to perform actions, comprising:

monitoring one or more performance metrics for one or more critical paths for one or more application instances, wherein the one or more performance metrics is external to the one or more network devices, and wherein the one or more critical paths is defined by one or more of: navigation between web documents that are required for one or more functions of the one or more application instances, sequence of actions that are performed on the one or more application instances, importance of actions that occur when the web documents are accessed by a user, web documents that perform operations that are critical to the one or more functions of the one or more application instances, web documents that have a higher availability requirement, or history of actions generated by the user interacting with the one or more application instances;

employing the one or more critical paths to identify one or more resources that is internal to the one or more network devices, wherein the one or more critical paths is recommended based on one or more of a history of usage of the one or more resources by user's interacting with the one or more resources, or analysis of received data regarding the one or more application instances, and wherein one or more critical paths are determined based on a history of usage and a history of system resource impact of particular paths of actions generated by users interacting with cloud applications;

monitoring one or more performance metrics for the one or more resources that is internal to the one or more network devices;

monitoring data regarding the one or more application instances that is internal to a virtual machine that is hosting the one or more application instances, wherein the internal data is adjustably normalized to produce values for a defined range, and wherein the adjustment of the normalization of the internal data is tuned to one or more performance characteristics of each application instance, and wherein the tuning comprises one or more of extending one or more running average windows to smooth out a response to one or more usage spikes, or reducing a duration of the one or more running average windows to smooth out a response to one or more rapid changes in use of the one resource;

generating one or more application scaling scores based on the one or more external performance metrics, the values for the defined range, and a determined application scaling threshold;

generating one or more resource scaling scores based on the one or more internal performance metrics and a determined resource scaling threshold;

when the one or more application scaling scores exceed the determined application scaling threshold, provisioning one or more additional application instances based on the one or more application scaling scores; and when the one or more resource scaling scores exceed the determined resource scaling threshold, scaling an allocation for the one or more resources based on the one or more resource scaling score.

2. The method of claim 1, further comprising, caching one or more requested resources of the one or more application instances based on the one or more external performance metrics.

3. The method claim 1, wherein provisioning the one or more additional application instances, further comprises, provisioning one or more virtual machines to host the one or more additional application instances.

4. The method of claim 1, wherein monitoring the one or more internal performance metrics, further comprises, monitoring one or more of a storage usage metric, a CPU usage metric, or a memory usage metric.

5. The method of claim 1, further comprising, determining the one or more critical paths based on monitoring a plurality of external requests to the one application instances that include a portion of the one or more critical paths, wherein the monitoring of the plurality of requests is performed by the one or more network devices.

6. The method of claim 1, wherein monitoring the one or more internal performance metrics, further comprises, enabling a hypervisor to monitor a plurality of virtualized resources associated with one or more virtual machines, wherein the one or more virtual machines is managed by the hypervisor.

7. The method of claim 1, wherein monitoring the one or more external performance metrics, further comprises, grouping each external performance metric into one or more batches that is classified by a time period.

8. A system arranged for scaling computing resources for a plurality of network devices over a network, wherein one or more network devices is operative to perform actions, comprising:

a server device, comprising:
      a transceiver that is operative to communicate over the network;
      a memory that is operative to store at least instructions; and a processor device that is operative to execute instructions that enable actions, including:
monitoring one or more performance metrics for one or more critical paths for one or more application instances, wherein the one or more performance metrics is external to the one or more network devices, and wherein the one or more critical paths is defined by one or more of: navigation between web documents that are required for one or more functions of the one or more application instances, sequence of actions that are performed on the one or more application instances, importance of actions that occur when the web documents are accessed by a user, web documents that perform operations that are critical to the one or more functions of the one or more application instances, web documents that have a higher availability requirement, or history of actions generated by the user interacting with the one or more application instances;
employing the one or more critical paths to identify one or more resources that is internal to the one or more network devices, wherein the one or more critical paths is recommended based on one or more of a history of usage of the one or more resources by user's interacting with the one or more resources, or analysis of received data regarding the one or more application instances, and wherein one or more critical paths are determined based on a history of usage and a history of system resource impact of particular paths of actions generated by users interacting with cloud applications;
monitoring one or more performance metrics for the one or more resources that is internal to the one or more network devices;
monitoring data regarding the one or more application instances that is internal to a virtual machine that is hosting the one or more application instances, wherein the internal data is adjustably normalized to produce values for a defined range, and wherein the adjustment of the normalization of the internal data is tuned to one or more performance characteristics of each application instance, and wherein the tuning comprises one or more of extending one or more running average windows to smooth out a response to one or more usage spikes, or reducing a duration of the one or more running average windows to smooth out a response to one or more rapid changes in use of the at least one resource;
generating one or more application scaling scores based on the one or more external performance metrics, the values for the defined range, and a determined application scaling threshold;
generating one or more resource scaling scores based on the one or more internal performance metrics and a determined resource scaling threshold;
when the one or more application scaling scores exceed the determined application scaling threshold, provisioning one or more additional application instances based on the one or more application scaling scores; and
when the one or more resource scaling scores exceed the determined resource scaling threshold, scaling an allocation for the one or more resources based on the one or more resource scaling score; and a client device, comprising:
a transceiver that is operative to communicate over the network;
a memory that is operative to store at least instructions; and
a processor device that is operative to execute instructions that enable actions, including, at least monitoring and administering the actions performed by the server device.

9. The system of claim 8, further comprising, caching one or more requested resources of the one or more application instances based on the one or more external performance metrics.

10. The system of claim 8, wherein provisioning the one or more additional application instances, further comprises, provisioning one or more virtual machines to host the one or more additional application instances.

11. The system of claim 8, wherein monitoring the one or more internal performance metrics, further comprises, monitoring one or more of a storage usage metric, a CPU usage metric, or a memory usage metric.

12. The system of claim 8, further comprising, determining the one or more critical paths based on monitoring a plurality of external requests to the one application instances that include a portion of the one or more critical paths, wherein the monitoring of the plurality of requests is performed by the one or more network devices.

13. The system of claim 8, wherein monitoring the one or more internal performance metrics, further comprises, enabling a hypervisor to monitor a plurality of virtualized resources associated with one or more virtual machines, wherein the one or more virtual machines is managed by the hypervisor.

14. The system of claim 8, wherein monitoring the one or more external performance metrics, further comprises, grouping each external performance metric into one or more batches that is classified by a time period.

15. A processor readable non-transitory storage media that includes instructions for scaling computing resources for a plurality of network devices over a network, wherein execution of the instructions by one or more processor devices enables actions, comprising:
monitoring one or more performance metrics for one or more critical paths for one or more application instances, wherein the one or more performance metrics is external to the one or more network devices, and wherein the one or more critical paths is defined by one or more of: navigation between web documents that are required for one or more functions of the one or more application instances, sequence of actions that are performed on the one or more application instances, importance of actions that occur when the web documents are accessed by a user, web documents that perform operations that are critical to the one or more functions of the one or more application instances, web documents that have a higher availability requirement, or history of actions generated by the user interacting with the one or more application instances;
employing the one or more critical paths to identify one or more resources that is internal to the one or more network devices, wherein the one or more critical paths is recommended based on one or more of a history of usage of the one or more resources by user's interacting with the one or more resources, or analysis of received data regarding the one or more application instances, and wherein one or more critical paths are determined based on a history of usage and a history of system resource impact of particular paths of actions generated by users interacting with cloud applications;

monitoring one or more performance metrics for the one or more resources that is internal to the one or more network devices;

monitoring data regarding the one or more application instances that is internal to a virtual machine that is hosting the one or more application instances, wherein the internal data is adjustably normalized to produce values for a defined range, and wherein the adjustment of the normalization of the internal data is tuned to one or more performance characteristics of each application instance, and wherein the tuning comprises one or more of extending one or more running average windows to smooth out a response to one or more usage spikes, or reducing a duration of the one or more running average windows to smooth out a response to one or more rapid changes in use of the at least one resource;

generating one or more application scaling scores based on the one or more external performance metrics, the values for the defined range, and a determined application scaling threshold;

generating one or more resource scaling scores based on the one or more internal performance metrics and a determined resource scaling threshold;

when the one or more application scaling scores exceed the determined application scaling threshold, provisioning one or more additional application instances based on the one or more application scaling scores; and when the one or more resource scaling scores exceed the determined resource scaling threshold, scaling an allocation for the one or more resources based on the one or more resource scaling score.

16. The media of claim 15, further comprising, caching one or more requested resources of the one or more application instances based on the one or more external performance metrics.

17. The media of claim 15, wherein provisioning the one or more additional application instances, further comprises, provisioning one or more virtual machines to host the one or more additional application instances.

18. The media of claim 15, wherein monitoring the one or more internal performance metrics, further comprises, monitoring one or more of a storage usage metric, a CPU usage metric, or a memory usage metric.

19. The media of claim 15, further comprising, determining the one or more critical paths based on monitoring a plurality of external requests to the one application instances that include a portion of the one or more critical paths, wherein the monitoring of the plurality of requests is performed by the one or more network devices.

20. The media of claim 15, wherein monitoring the one or more internal performance metrics, further comprises, enabling a hypervisor to monitor a plurality of virtualized resources associated with one or more virtual machines, wherein the one or more virtual machines is managed by the hypervisor.

21. The media of claim 15, wherein monitoring the one or more external performance metrics, further comprises, grouping each external performance metric into one or more batches that is classified by a time period.

* * * * *